May 13, 1924.
F. J. REICHMANN
TRAILER TRUCK
Filed Oct. 11, 1919
1,494,077
3 Sheets-Sheet 1
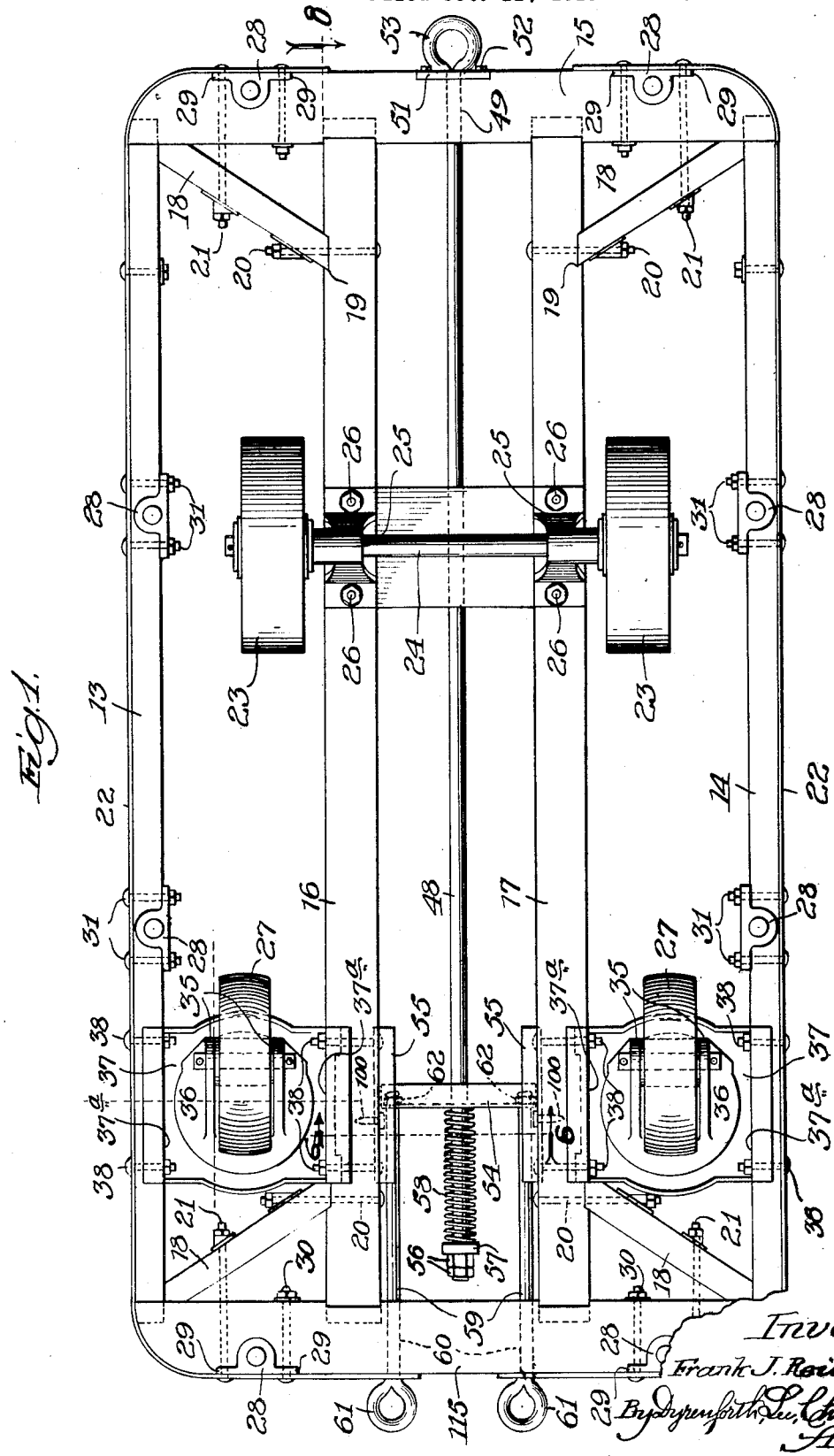

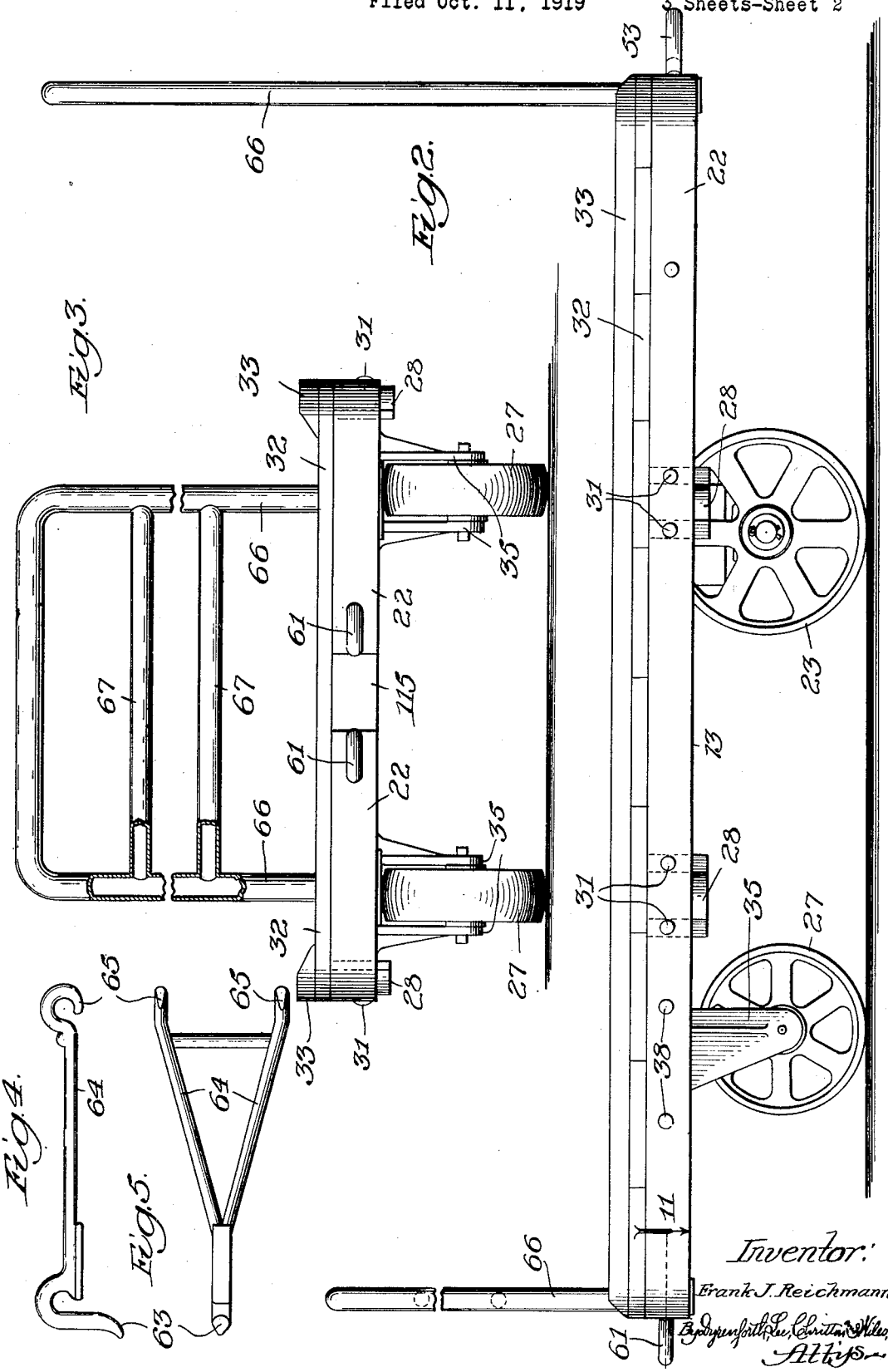

May 13, 1924.
F. J. REICHMANN
TRAILER TRUCK
Filed Oct. 11, 1919
1,494,077
3 Sheets-Sheet 3
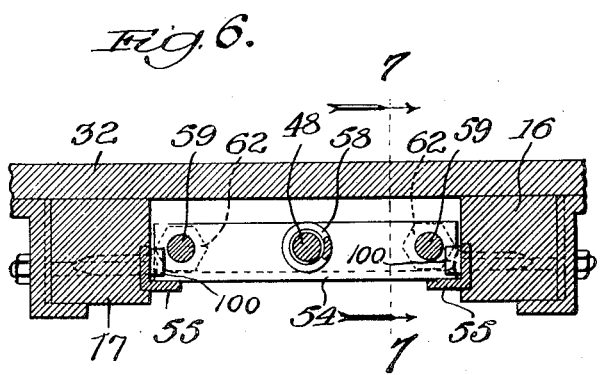
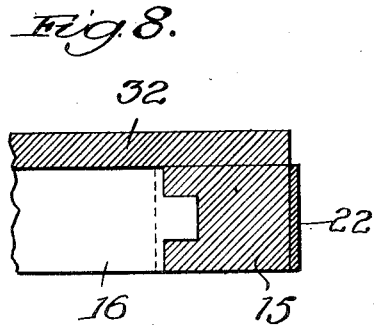
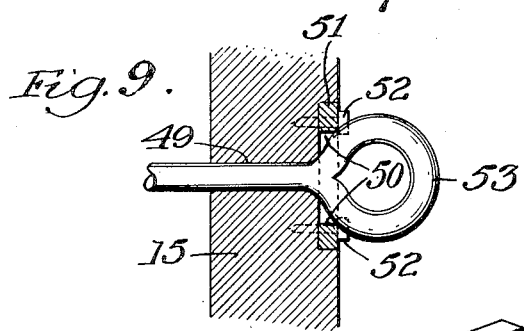
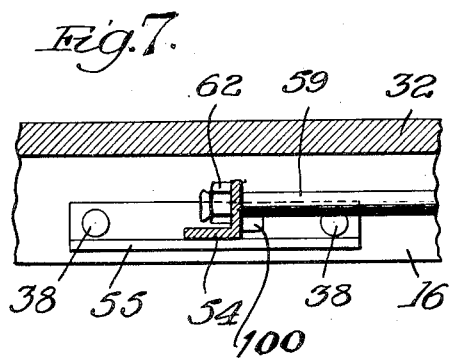
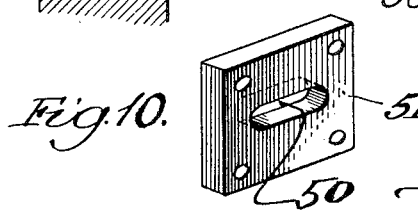
Inventor:
Frank J. Reichmann, Patented May 13, 1924.

1,494,077

UNITED STATES PATENT OFFICE.

FRANK J. REICHMANN, OF CHICAGO, ILLINOIS, ASSIGNOR TO AMERICAN PRODUCTION AND TRADING COMPANY, OF CHICAGO, ILLINOIS, A CORPORATION OF ILLINOIS.

TRAILER TRUCK.

Application filed October 11, 1919. Serial No. 330,087.

*To all whom it may concern:*

Be it known that I, FRANK J. REICHMANN, a citizen of the United States, residing at Chicago, in the county of Cook and State of Illinois, have invented a new and useful Improvement in Trailer Trucks, of which the following is a specification.

My invention relates more particularly to improvements in trailer-trucks for use in connection with trackless motor vehicles; and my primary objects are to provide a novel, simple and comparatively inexpensive construction of trailer-truck; to provide a truck which will be capable of withstanding, to a highly effective degree, the shock and impact to which they are oftentimes subjected in use; to improve upon the details of such constructions; and other objects as will appear from the following.

Referring to the accompanying drawings, Fig. 1 is a bottom plan view of a trailer-truck constructed in accordance with my invention, one corner of the truck being broken away. Fig. 2 is a view in longitudinal elevation of the truck of Fig. 1. Figure 3 is an end view of the truck with certain parts sectioned. Figure 4 is a view in side elevation of the form of hitch employed. Figure 5 is a bottom plan view of the hitch. Figure 6 is a section taken at the line 6 on Fig. 1 and viewed in the direction of the arrow. Figure 7 is a section taken at line 7—7 on Fig. 6 and viewed in the direction of the arrows. Figure 8 is a broken section taken at the line 8 on Fig. 1 and viewed in the direction of the arrow. Figure 9 is a plan sectional view of one of the end-sills showing the adjacent portion of the adjacent portion of the draft mechanism; and Figure 10, a perspective view of a bearing plate carried by this sill and co-operating with the draft mechanism.

The trailer-truck in accordance with the preferred illustrated embodiment of my invention is formed of a frame comprising side sills 13 and 14, end sills 15 and 115, and center sills 16 and 17, this frame being shown as formed of timber, though it will be understood that it may be of structural metal. The side and center sills are mortised into the end sills as illustrated, the latter by preference being of greater cross-section than the other sills, the frame thus formed being braced by means of braces represented at 18 which are mortised into the center sills at 19 and engage at their opposite ends the corners of the frame as shown, lag-bolts 20 passing through the center sills and the adjacent ends of the braces 18 and lag-bolts 21 passing through the latter and the end sills, serving to firmly connect these parts together. The frame work thus formed is preferably bounded by metal straps which extend over the lateral edges of the frame at the corners of the latter and preferably along the opposite sides of the frame as shown, these metal bands being represented at 22.

The rear end of the truck is provided with two wheels 23 shown as journaled on a shaft 24 mounted in bearings 25 secured to the under sides of the sills 16 and 17 as by the bolts 26; and its front end is provided with a pair of caster-wheels 27 located at opposite sides of the median line of the truck, these wheels being supported as hereinafter described.

In the particular construction illustrated the draft rigging is formed of a rod 48 extending lengthwise of the truck, this rod being guidingly supported in an opening 49 in the rear end sill 15 and in an elongated opening 50 in a bearing plate 51 set into this sill and secured thereto as by the screws 52, the elongated opening 50 being provided for holding the outer eye-shaped end 53 of the rod 48 in horizontal position. The opposite end of the rod 48 slides in an opening in a cross-bar 54, supported on flanges 55 extending inwardly from the center sills 16 and 17, this end of the rod being provided with stop-nuts 56 abutted by a washer 57 between which latter and the cross-bar 54, a coiled spring 58, surrounding the rod 48, extends. The rigging referred to also comprises a pair of parallel rods 59 located at opposite sides of the median line of the truck and extending into openings 60 in the end sill 115. The outer ends of the rods 59 are of eye-shape as represented at 61 and abut the outer surface of the end sill 115 and their inner ends connect with the cross-bar 54 through the medium of nuts 62, there being provided on the center sills, lag-screws 100 which overlap the cross-bar 54 and limit its movement to the left in Fig. 1. The spring 58 operates to shift the rod 48 to the left in Fig. 1, this spring being normally under tension and tending to shift the rod 48 as stated and serving to hold it normally in the position shown in Fig. 1. In the drawing of the truck, through the medium of the draft gear, the propelling engagement of the latter with the truck is, in the particular arrangement shown, between the cross-bar 54 and the center sills 16 and 17 through the lag-screws 100, the spring 58 serving primarily as a buffer between the rod 48 and the truck to lessen shock thereto when jerking occurs.

Any desirable form of hitch for connecting the truck with another truck or with a propelling vehicle may be provided, the hitch shown in the drawings (Figs. 4 and 5) being formed with a hook 63 at one end for engaging the eye 53, and at its opposite ends with diverging arms 64 terminating in hooks 65, spaced apart and located at opposite sides of the median line of the hitch for engaging the eyes 61.

It will be readily understood that a truck having a supporting frame as shown and described may be relatively economically constructed, and presents a high degree of rigidity and resistance to stress to which a structure of this character is subjected in use. Furthermore, the provision of stake-pockets, as explained, frees the outer edges of the frame of such projections as would be objectionable in the use of the truck and which would be subject to breakage, and still permits of substantially all of the space provided by the truck being used for supporting objects.

While I have illustrated and described a particular structure embodying my improvements, I do not wish to be understood as intending to limit it thereto, it being my intention to claim my invention as fully and completely as the prior state of the art will permit.

What I claim as new and desire to secure by Letters Patent is:

1. In a trackless vehicle, the combination of its body formed with a center sill structure, and draft-rigging comprising a plurality of members supported on said body and having driving engagement with said center sill structure, said members having coupling portions at opposite ends of the body, and a spring connection between said members, the portion of the vehicle relative to which the movable part of said draft rigging is movable containing a slot through which one of said members extends, the coupling portion of the part of the draft rigging extending through said slot presenting an elongated part which extends into said slot and prevents the turning of said last-referred-to portion of the draft-rigging, said movable part being capable of rotation relative to the part through which it extends were its elongated part drawn out of said slot.

2. In a structure of the character set forth, the combination of a body structure presenting a center sill structure, a cross-piece on said body structure, rods extending from said cross-piece longitudinally thereof and presenting connecting portions spaced apart at one end of the vehicle, another rod having a connecting portion at the other end of the vehicle and sliding in said cross-piece, a spring interposed between said cross-piece and said last-referred-to rod, and means whereby draft on said first-referred-to rods is transmitted to said center sill structure through said cross-piece.

3. In a structure of the character set forth, the combination of a body structure, a cross-piece movable along said body structure lengthwise of the latter, rods extending from said cross-piece longitudinally of said body structure and presenting connecting portions spaced apart at one end of the vehicle, another rod having a connecting portion at the other end of the vehicle and sliding in said cross-piece, stops on said body structure for limiting the movement of said cross-piece in one direction, and a spring constructed and arranged to cushion movement of said cross-piece against said stops.

4. In a structure of the character set forth, the combination of a body structure presenting a center sill structure, a cross-piece on said body structure, rods extending from said cross-piece longitudinally thereof and presenting connecting portions spaced apart at one end of the vehicle, another rod having a connecting portion at the other end of the vehicle and sliding in said cross-piece, a spring interposed between said cross-piece and said last-referred-to rod, and means whereby draft on said first-referred-to rods is transmitted to said center sill structure through said cross-piece, the parts being so constructed and arranged that said cross-piece and said first-referred-to rods are held against extensive movement lengthwise of the structure.

5. In a structure of the character set forth, the combination of a body structure, a cross-piece movable along said body structure lengthwise of the latter, rods extending from said cross-piece longitudinally of said body structure and presenting connecting portions spaced apart at one end of the vehicle, another rod having a connecting portion at the other end of the vehicle and sliding in said cross-piece, stops on said body structure for limiting the movement of said cross-piece in one direction, and a spring constructed and arranged to cushion movement of said cross-piece against said stops, the parts being so constructed and arranged that said cross-piece and said first-referred-to rods are held against movement lengthwise of the structure.

6. In a structure of the character set forth, the combination of a body structure, and spring draft-rigging mounted thereon and extending from end to end of said body structure, said draft-rigging presenting at one end of said body structure a plurality of spaced connecting portions for a coupling and at its opposite end a single connecting portion for a coupling.

7. In a structure of the character set forth, the combination of a body structure, and spring draft-rigging mounted thereon and extending from end to end of said body structure, said draft rigging having movement bodily relative to said body structure and presenting at one end of said body structure a plurality of spaced connecting portions for a coupling and at its opposite end a single connecting portion for a coupling.

8. In a structure of the character set forth, the combination of a body structure, and spring draft-rigging mounted thereon and extending from end to end of said body structure, said draft-rigging presenting at one end of said body structure a plurality of spaced connecting portions for a coupling and at its opposite end a single connecting portion for a coupling, and a solid V-hitch coupling engaging at one end with said spaced connecting portions.

9. In a structure of the character set forth, the combination of a body structure, and draft-rigging mounted thereon and extending from end to end of said body structure, said draft-rigging being formed with a section located adjacent one end of the vehicle and with another section located adjacent the other end of the vehicle, one of said sections presenting at one end of said body structure a plurality of spaced connecting portions for a coupling and the other of said sections presenting at the opposite end of the vehicle a single connecting portion for a coupling, said draft-rigging operatively engaging said body structure to produce draft on the latter, and a spring interposed between said draft rigging sections to afford a resilient connection therebetween.

10. In a structure of the character set forth, the combination of a body structure, and spring draft-rigging mounted thereon and extending from end to end of said body structure, said draft-rigging presenting at one end of said body structure a plurality of spaced connecting portions for a coupling and at its opposite end a single connecting portion for a coupling, the portion of said draft-rigging presenting said spaced connecting portions being held against movement lengthwise of the structure, and the opposite end of said draft-rigging being movable lengthwise of the structure against the resistance of the spring.

11. In a vehicle, the combination of its body and draft-rigging thereon comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, and a cross-member operatively engaging said rod and rods.

12. A vehicle, having a body and draft-rigging thereon comprising a rod portion extending lengthwise of the vehicle for connection at one end, adjacent one end of the vehicle, with another vehicle and movable lengthwise thereof, portions extending laterally in opposite directions from said rod portion, and a plurality of rod-portions spaced apart at opposite sides of the plane in which said first-referred-to rod portion extends and extending lengthwise of the vehicle and movable lengthwise thereof, said last-named rod-portions being connected at their inner ends with said laterally-extending portions and provided for connection at their outer ends with another vehicle.

13. In a vehicle, the combination of its body and draft-rigging thereon comprising a rod movable lengthwise of said body, a spring operatively interposed between said body and rod, said body having an opening through which said rod extends outwardly, the outer end of said rod being provided for connection with another vehicle and the portion of said rod adjacent said opening being of enlarged cross-sectional area.

14. In a vehicle, the combination of its body and draft-rigging thereon comprising a rod movable lengthwise of said body, a spring operatively interposed between said body and rod, said body having an opening through which said rod extends outwardly, the outer end of said rod being provided for connection with another vehicle and the portion of said rod adjacent said opening being of enlarged cross-sectional area and of less thickness vertically than horizontally.

FRANK J. REICHMANN.